United States Patent [19]

de Almada

[11] 4,317,047
[45] Feb. 23, 1982

[54] ENERGY HARNESSING APPARATUS

[76] Inventor: Fernando F. de Almada, Rua Cottinelli Telmo Residencia S. Jose, 11, S. Pedro do Estoril, Portugal

[21] Appl. No.: 108,463

[22] Filed: Dec. 31, 1979

[30] Foreign Application Priority Data

Dec. 29, 1978 [PT] Portugal .............................. 68996[U]

[51] Int. Cl.$^3$ ......................... F03B 13/10; F03B 13/12
[52] U.S. Cl. ....................................... 290/53; 60/506; 416/86; 417/332
[58] Field of Search ................................... 290/42–44, 290/53–55; 415/7; 416/84–86; 417/61, 330–332, 337; 60/470, 495, 497–498, 500, 502, 506–507, 499; 310/338

[56] References Cited

U.S. PATENT DOCUMENTS

| 901,117 | 10/1908 | McManus | 290/53 |
| 974,869 | 11/1910 | Farmer | 60/398 |
| 1,584,293 | 5/1926 | Hegenbarth | 185/30 |
| 1,852,145 | 4/1932 | Brown | 417/61 |
| 4,105,368 | 8/1978 | Waters | 60/500 |
| 4,110,630 | 8/1978 | Hendel | 290/42 |

FOREIGN PATENT DOCUMENTS

| 1602911 | 4/1971 | France . | |
| 52-14150 | 2/1977 | Japan | 290/53 |
| 235508 | 6/1925 | United Kingdom . | |
| 297720 | 9/1928 | United Kingdom . | |
| 1513308 | 6/1978 | United Kingdom . | |

Primary Examiner—J. V. Truhe
Assistant Examiner—Shelley Wade
Attorney, Agent, or Firm—Spencer & Kaye

[57] ABSTRACT

An apparatus for harnessing the energy derived from the undulatory motion of a body of water includes an assembly having a buoyancy sufficient for maintaining it afloat in the water, a first structure substantially following multidirectional undulatory motions of the water and a second structure mounted in the assembly for free movement in a plurality of planes with respect to the first structure. The second structure is displaceable by gravity and by forces derived from the motions of said first structure. There is further provided a device connected to the first and second structures for generating a pressure output in response to the force derived from the relative motions between the first and second structures. An arrangement is coupled to the pressure output of the device for utilizing, at least indirectly, the energy derived from the pressure output.

8 Claims, 3 Drawing Figures

ENERGY HARNESSING APPARATUS

BACKGROUND OF THE INVENTION

This invention relates to an apparatus that utilizes the kinetic or potential energy derived from the motion of waves of bodies of water by converting such energy, for example, into electric energy.

An apparatus of the above-outlined type is known which comprises a buoy-like structure which rides on the surface of the waves and which has a pendulum whose kinetic energy derived from its swinging motions is utilized. In this known apparatus, in the zone of the pendulum suspension there is situated a gear assembly driven by the oscillating pendulum and connected to an electric generator. The pendulum is necessarily designed for a motion in a single plane and thus has two significant disadvantages: the multi-directional swinging (bobbing) motion of the buoy-like structure is not utilized efficiently since the pendulum is unable to respond to motions in certain directions and further, heavy structure is needed to maintain the swinging motion of the pendulum in its predetermined plane and to prevent torques from causing damage to the pendulum or the gears. Attempts to continuously reorient the buoy-like structure to maintain an alignment between the changing direction of water motion and the single plane of pendulum motion have not been successful.

SUMMARY OF THE INVENTION

It is an object of the invention to provide an improved energy harnessing apparatus of the above-outlined type from which the above-noted disadvantages are eliminated, which operates more efficiently and which, without a multiplication of features ensures a more even supply of output energy than it has been possible heretofore.

This object and others to become apparent as the specification progresses, are accomplished by the invention, according to which, briefly stated, there is provided a first structure which generally follows the positional variation of water masses due to wave motions and a second structure which is mounted on the first structure and which by virtue of gravity acting thereon, is capable of displacement as a unit relative to the first structure in response to any swinging motion of the first structure. Thus, relative displacements occur between the first and second structures in response to any motion of the first structure caused by wave motion. A device is interconnected between the first and second structure for taking up the forces derived by the relative motion between the first and second structures and for using such force directly or indirectly by converting it, for example, into electric energy.

DESCRIPTION OF THE PREFERRED EMBODIMENT

Figure 1:
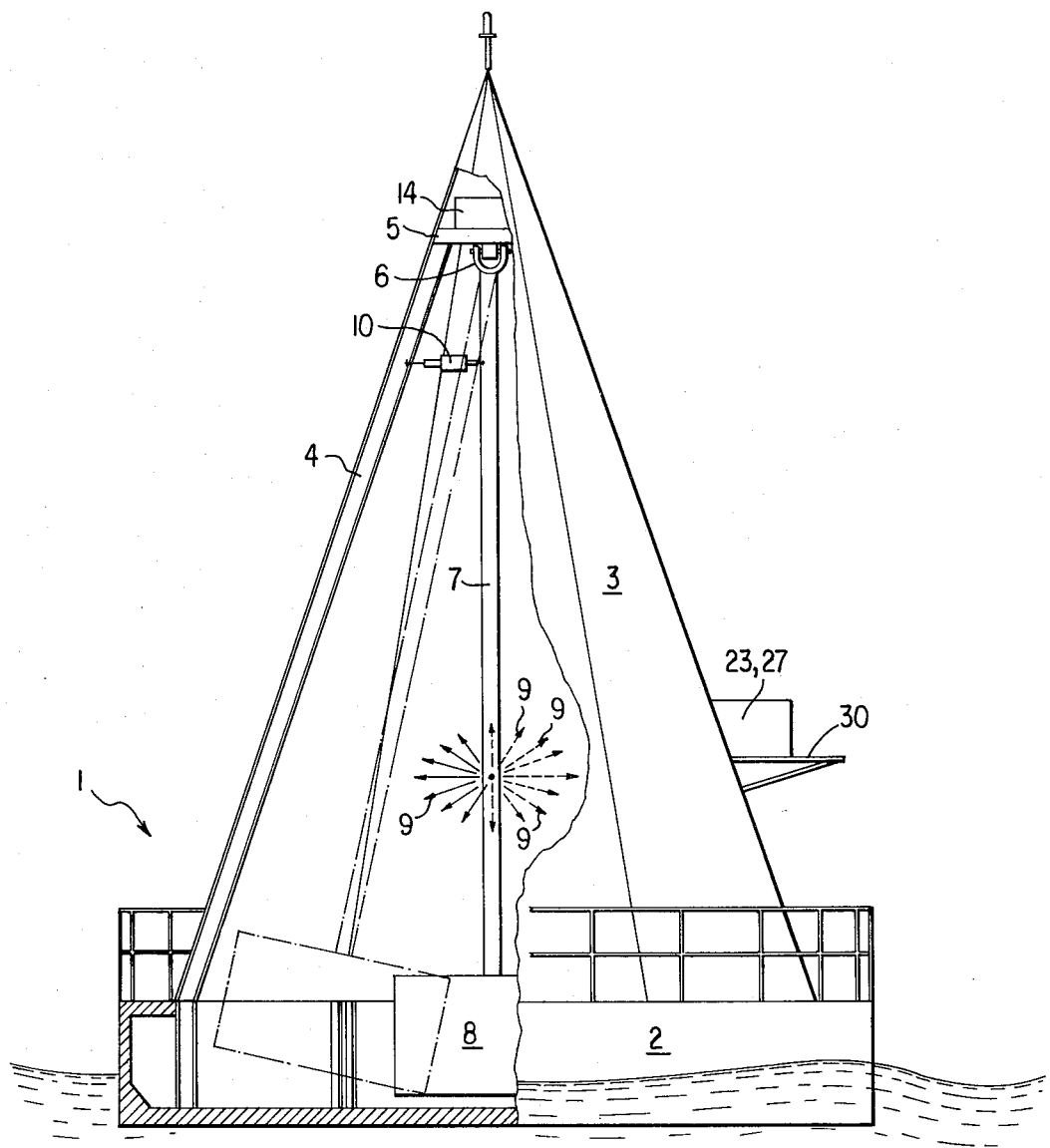
FIG. 1 is a schematic elevational view of a preferred embodiment of the invention.
Figure 2:
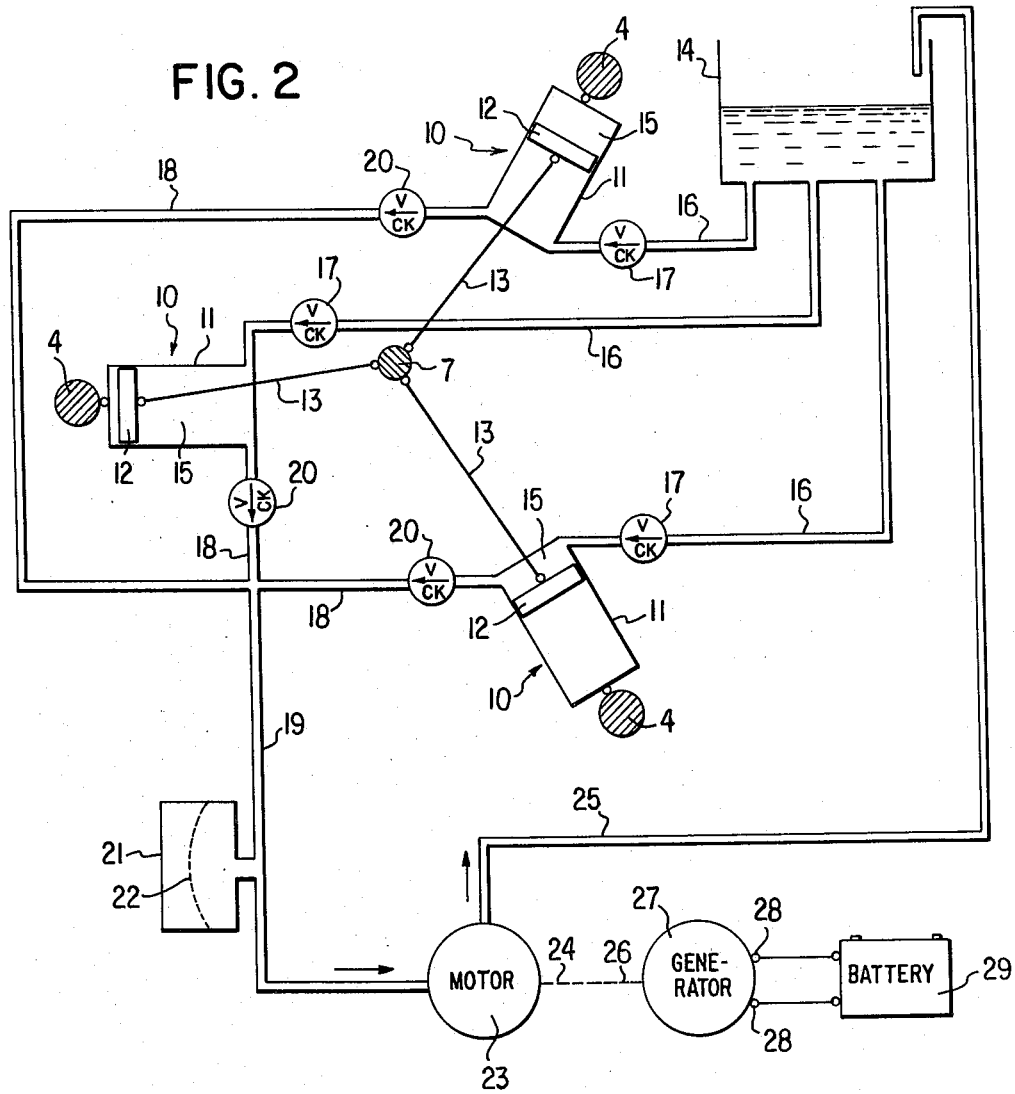
FIG. 2 is a schematic top plan view of some parts of the preferred embodiment and includes a block diagram of the energy conversion system.

Turning now to FIGS. 1 and 2, a preferred embodiment of the apparatus according to the invention comprises a floating assembly generally indicated at 1 having a buoyant base 2 supporting a superstructure 3 essentially formed of inclined beams 4 connected at the top by an upper platform 5.

From the platform 5 there is suspended, by means of a universal joint 6 (such as a cardan joint) a pendulum formed of a pendulum bar 7 and a pendulum weight 8. As illustrated by the plurality of arrows 9 lying in a horizontal plane, a relative displacement will occur between the pendulum 7, 8 and the superstructure 3 as the buoyant base 2 and the superstructure 3 generally follow the wave motion as a rigid unit. By virtue of the suspension by means of the universal joint 6, the pendulum 7, 8 has a freedom of swinging motion in all directions.

At a distance from the upper platform 5, the pendulum bar 7 is connected to the beams 4 by a plurality of hydraulic cylinder units 10. As shown in FIG. 2, preferably three such cylinder units 10 are provided at a 120° spacing as viewed in a horizontal plane. Each cylinder unit has a cylinder 11 jointed to the respective inclined beam 4 in an abutting relationship with an inward side thereof oriented toward the pendulum bar 7 and a piston 12 slidably received in the cylinder and provided with a piston rod 13 which is articulated to the respective piston 12 and the pendulum bar 7. Thus, any relative motion between the pendulum 7, 8 and the structure formed essentially of the inclined beams 4, will cause a displacement of the pistons 12 in their respective cylinders 11.

A reservoir 14 containing hydraulic liquid and secured, for example, to the upper platform 5, communicates with a work chamber 15 of each cylinder 11 by means of a supply conduit 16. A check valve 17 in each supply conduit 16 ensures a unidirectional flow of hydraulic liquid from the reservoir 14 into the respective cylinder 11.

From each work chamber 15 there extends a respective pressure conduit 18 each provided with a check valve 20 for preventing a back flow of the hydraulic liquid towards the cylinder units 10. The pressure conduits 18 merge into a main output pressure conduit 19 which communicates with an accumulator 21 serving to equalize the pressure in the conduit 19. The accumulator is of conventional construction: it comprises a diaphragm 22 exposed at one side to the hydraulic pressure in the main pressure conduit 19 and on the other side to the pressure of an inert gas such as nitrogen.

Downstream of the accumulator 21 as viewed in the direction of hydraulic flow, the main output pressure conduit 19 is connected to an input of a conventional hydraulic motor 23 having a rotary output shaft 24. A hydraulic discharge conduit 25 returns hydraulic liquid from the hydraulic motor 23 to the reservoir 14. The rotary output shaft 24 is connected to a rotary input shaft 26 of a conventional electric current generator 27. From the electric output terminals 28 the electric current may be utilized directly by a consumer on land (for example, via underwater cables) or may be applied to a storage battery 29 for subsequent utilization. The motor 23 and the generator 27 may be supported on a shelf 30 mounted on the superstructure 3.

In the description which follows, the mode of operation of the above-described preferred embodiment will be set forth.

As the floating assembly 1—anchored in some manner to prevent it from being driven out to sea—swings in different directions, generally following the wave motions of the body of water, the pendulum bar 7 continuously changes its position with respect to the superstructure 3. Such a relative motion causes a displacement of all the pistons 12 in their respective cylinders 11. The extent and sense of such displacement will, at any given time, depend on the extent and direction of displacement of the pendulum bar 7 at that moment. In view of the provision of at least three uniformly distributed cylinder units 10, for any displacement of the pendulum bar, at least one piston 12 in its respective cylinder 11 will execute a work stroke, that is, a motion which tends to reduce the volume of the work chamber 15. Such a work stroke thus pressurizes the hydraulic liquid in the work chamber and displaces it through the respective pressure conduit 18 thus causing a flow of hydraulic liquid in the main output pressure conduit 19. The check valve 17 in the respective supply conduit 16 prevents the pressurized hydraulic liquid from flowing from the work chamber 15 back into the reservoir 14. At the same time in at least one of the hydraulic cylinder units 10 the respective piston 12 executes a suction stroke, that is, a motion which increases the volume of the respective work chamber 15. Such a suction stroke draws hydraulic liquid from the reservoir 14 through the supply conduit 16 into the work chamber 15. At the same time the respective check valve 20 is closed, thus preventing liquid from being drawn back into the work chamber through the pressure conduit 18.

The continuous swinging (bobbing) motion of the floating assembly, coupled with the provision of a plurality of circularly distributed hydraulic cylinder units 10 as well as coupled with the provision of the pressure equalizing accumulator 21 ensure a generally uniform pressurized hydraulic liquid flow in the main output pressure conduit 19 into the hydraulic motor 23. From the hydraulic motor 23 the hydraulic liquid, after it has performed its work, flows back into the reservoir 14 through the discharge conduit 25.

Figure 3:
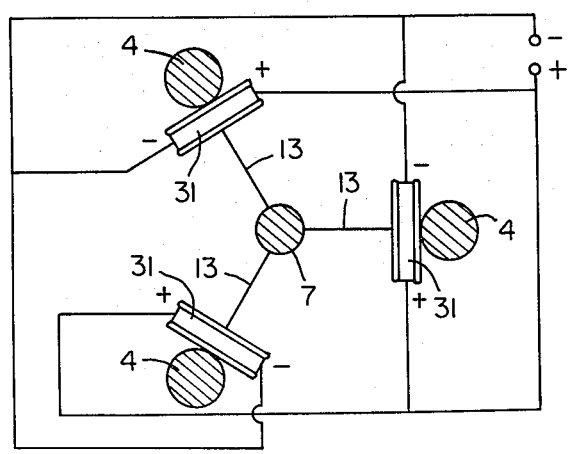
FIG. 3 is a schematic top plan view of another preferred embodiment of the invention.

While in the preceding description of a preferred embodiment a hydraulic system for driving a generator is set forth, it is feasible, for example, as shown in FIG. 3, to provide between the pendulum bar 7 and the respective beams 4 piezoelectric members 31 which generate electricity directly as pressure is applied on opposite faces thereof. Such pressure will be generated when the pendulum bar 7 tends to move towards the respective beam 4. Or, it is feasible to provide a purely mechanical crank system between the pendulum bar and the means for causing rotation of a flywheel by crank and linkage assemblies. Or, the pendulum structure 7, 8 can conceivably by replaced, for example, by a displaceable weight member, such as a spherical mass supported on a dish-like platform and connected to the superstructure by hydraulic cylinder units. Further, the floating assembly may be of the type that is in its entirety below the surface of the water to follow the local displacement of water masses underneath the water surface.

It will be understood that the above description of the present invention is susceptible to various modifications, changes and adaptations, and the same are intended to be comprehended within the meaning and range of equivalents of the appended claims.

What is claimed is:

1. In an apparatus for harnessing the energy derived from the undulatory motion of a body of water, including an assembly having a buoyancy sufficient for maintaining it afloat in the water, the improvement comprising (a) a first structure mounted on the assembly and substantially following therewith multidirectional undulatory motions of the water; said first structure having generally upwardly oriented beams having upper ends connected at least indirectly to one another;
   (b) a second structure mounted in said assembly for free movement in a plurality of planes with respect to said first structure; said second structure comprising a pendulum including a pendulum bar and a pendulum weight attached to the pendulum bar and a joint suspending said pendulum bar from the upper ends of said beams and permitting motion of said pendulum in said plurality of planes; said beams together enclosing said pendulum; each beam having an inward side oriented towards said pendulum;
   (c) a device connected to said pendulum and to at least some of said beams for generating a pressure output in response to the force derived from the relative motions between said pendulum and said beams; said device comprising hydraulic cylinder units, each including a cylinder and a piston slidable therein; each said cylinder and the associated piston defining a work chamber accommodating hydraulic liquid and having an outlet opening constituting said pressure output; each said cylinder being connected to a separate beam in an abutting relationship with said inward side thereof and each said piston being connected with said pendulum for causing said pistons to pressurize hydraulic liquid in respective said work chambers by the force derived from the motion of said pendulum relative to said beams; and
   (d) means coupled to said pressure output of said device for utilizing, at least indirectly, the energy derived from said pressure output.

2. An apparatus as defined in claim 1, wherein said means coupled to said pressure output comprises hydraulic conduit means for channeling hydraulic liquid pressurized and displaced by said piston.

3. An apparatus as defined in claim 2, wherein said means coupled to said pressure output further comprises a hydraulic motor coupled to said hydraulic conduit means to be driven by the pressurized hydraulic liquid.

4. An apparatus as defined in claim 3, further comprising an electric generator having an input shaft coupled to an output shaft of said hydraulic motor.

5. An apparatus as defined in claim 4, further comprising a storage battery connected to an output of said electric generator.

6. An apparatus as defined in claim 1, wherein said hydraulic cylinder units are at least three in number and extend radially from said pendulum to said beams.

7. An apparatus as defined in claim 6, wherein said hydraulic cylinder units are uniformly distributed when viewed in a horizontal plane.

8. In an apparatus for harnessing the energy derived from the undulatory motion of a body of water, including an assembly having a buoyancy sufficient for maintaining it afloat in the water, the improvement comprising (a) generally upwardly oriented beams having upper ends connected at least indirectly to one another; said beams being mounted on the assembly and substantially following therewith multidirectional undulatory motions of the water;

(b) a pendulum including a pendulum bar and a pendulum weight attached to the pendulum bar and a joint suspending said pendulum bar from the upper ends of said beams for permitting an exertion of forces of said pendulum in a plurality of planes; said beams together enclosing said pendulum; each beam having an inward side oriented towards said pendulum; and (c) piezoelectric members, each connected to a separate beam at said inward side thereof and to said pendulum for directly generating electricity in response to pressure forces derived from a tendency of motion of said pendulum relative to said beams.

* * * * *